Jan. 16, 1934. H. T. RINGROSE Re. 19,048

DETECTING, INDICATING, AND RECORDING THE PRESENCE OF INFLAMMABLE VAPORS OR GASES

Original Filed April 6, 1927 5 Sheets-Sheet 1

Inventor

Henry T. Ringrose,

By J. H. McCuaig, his attorney.

Inventor
Henry T. Ringrose,
By J. J. McCrady,
his attorney.

Jan. 16, 1934. H. T. RINGROSE Re. 19,048

DETECTING, INDICATING, AND RECORDING THE PRESENCE OF INFLAMMABLE VAPORS OR GASES

Original Filed April 6, 1927 5 Sheets-Sheet 3

Inventor
Henry T. Ringrose,
By Geo. H. McCrady
his Attorney.

Inventor
Henry T. Ringrose,
By J. H. McCrady,
his attorney.

Jan. 16, 1934. H. T. RINGROSE Re. 19,048

DETECTING, INDICATING, AND RECORDING THE PRESENCE OF INFLAMMABLE VAPORS OR GASES

Original Filed April 6, 1927 5 Sheets-Sheet 5

INVENTOR
HENRY T. RINGROSE

BY J. H. McCready
ATTORNEY

Reissued Jan. 16, 1934

Re. 19,048

UNITED STATES PATENT OFFICE 19,048

DETECTING, INDICATING, AND RECORDING THE PRESENCE OF INFLAMMABLE VAPORS OR GASES

Henry Thomas Ringrose, West Park, Leeds, England

Original No. 1,645,404, dated October 11, 1927, Serial No. 181,414, April 6, 1927, and in Great Britain September 28, 1925. Application for reissue January 27, 1933. Serial No. 653,908

17 Claims. (Cl. 23—255)

This invention relates to the detection of inflammable gases or vapors in the atmosphere of mines and other places where the presence of combustible constituents in the atmosphere is objectionable.

The invention has for its general object to provide for the more accurate and reliable detection of such constituents, together with the operation of suitable indicating, recording, or other apparatus, as may be desirable to meet the requirements of particular circumstances.

It has been proposed heretofore to measure the proportion of marsh gas present in the atmosphere by allowing the gas to diffuse into a porous vessel, producing combustion of the marsh gas in said vessel, absorbing the carbon dioxide created by such combustion, and measuring the decrease in pressure produced in the vessel as a result of such absorption. In using apparatus of this type in mines and similar locations it has been found that serious sources of error are introduced due to the necessity of using an absorbent for the $CO_2$. The percentage of marsh gas permissible in the atmosphere of a mine is relatively small, say for example, 4% or 5%. Usually there is also present in the mine atmosphere a substantial percentage of carbon dioxide, say for example, one to three percent. All of the absorbents for carbon dioxide of which I am aware, and which are suitable for use in an apparatus of this type, also absorb moisture from the atmosphere. Consequently, the degree of vacuum produced in apparatus of the type just described is affected not only by the carbon dioxide generated by the burning of the marsh gas or other combustible constituents in the atmosphere, but also by the presence of the carbon dioxide and the moisture in the surrounding atmosphere. Thus it will be seen that the actual indication given by such an apparatus is exceedingly unreliable. Furthermore, it is necessary to renew the absorbent at frequent intervals, and the results produced by it in the testing apparatus vary widely with the condition of the absorbent.

It has also been proposed heretofore to burn the combustible constituents of the surrounding atmosphere in a substantially closed vessel, and to measure the change in pressure so produced without absorbing the carbon dioxide formed. This apparatus, however, so far as I am aware, has been adapted only for the making of intermittent tests, such as would be made in a laboratory, and has not been at all suited to the requirements of mining operations, or for continuous use or operation.

The present invention aims to eliminate the use of absorbents, to provide for the substantially continuous testing of the atmosphere, and to devise an apparatus which will require so little skill on the part of the user that it can be used satisfactorily by the miners.

According to the invention I provide an instrument or apparatus wherein a vacuum proportional to the amount of inflammable vapors or gases surrounding a porous vessel capable of maintaining a gas pressure for a substantial time is created in said vessel by combustion of the inflammable vapors or gases which diffuse through or are aspirated to said vessel, and in which the vacuum produced by the condensation of the water vapor so created is utilized to operate an indicator or recorder. In an embodiment of the invention the apparatus may consist of two porous vessels, the open ends of which may be sealed or made air-tight by means of two caps. One of the porous vessels may be totally enclosed to prevent any inflammable gas or vapor reaching the interior, whilst the other porous vessel may be exposed to the inflammable gas or vapor in such a way that by the process of diffusion through the porous vessel, the inflammable gas reaches the interior where it is burnt, for example in the case of marsh gas according to the equation $CH_4+2O_2=CO_2+2H_2O$, a vacuum proportional to the amount of inflammable gas surrounding the porous vessel being produced owing to the condensation of the water vapor. This condensation of the created water vapor will occur by virtue of the fact that the walls of the vessel in which the combustion occurs, are at a temperature considerably below 212° Fahrenheit. The testing operation may go on continuously or for substantial periods of time but the periods during which the marsh gases burn usually are relatively brief, and the quantity of gas burned is only a small percentage of the total volume of air, so that no great rise in temperature occurs because the combustible constituent of the air is burned approximately as fast as it comes in contact with the flame or hot wire. The vacuum thus produced may be used to operate an indicator or recorder working in conjunction with a chart showing the percentage of marsh gas and provision may be made to give visible or audible signals when the percentage reaches a predetermined quantity.

One method of creating the combustion may be to utilize inside or with the porous vessels platinum wire or its equivalent with or without a catalytic mass of platinum black or the like heated by an electric current. The second porous vessel (arranged so as to be protected from exposure to the inflammable gas as already indicated) may also have a hot platinum wire or equivalent in its interior or associated therewith exactly similar to that of the porous vessel exposed to the inflammable gas, there being, however, no combustion in the latter vessel owing to the absence of the inflammable gas, this porous vessel and hot wire serving to compensate for the expansion of vapor or gas which occurs immediately the wire is made hot in the other porous vessel. By this arrangement no difference in pressure exists between the interiors of the two respective porous vessels under ordinary circumstances, but immediately any inflammable gas reaches or passes into the interior of one of them the difference in pressure operates the indicator or recorder owing to the combustion of the inflammable gas and the condensation of the water vapor so produced with consequent reduction in volume. Such a trap may be merely a U tube extending downwardly from a bottom, lateral wall of the chamber 6. The second porous vessel ensures the reading of the indicator or recorder to be independent of fluctuations of atmosphere, pressure and temperature. The condensed water collecting at the bottom of the porous chamber in which combustion occurs may be drawn off by a tap or trap without disturbing the vacuum produced. Whilst preferring the employment of the two vessels above referred to, in some cases one vessel only may be employed and in this connection the term vessel includes any appropriate device or member adapted to enable gases or vapors to be passed into the vicinity of or contact with a heated element for determining the inflammability of the atmosphere surrounding the instrument or apparatus.

Instead of relying on diffusion of the inflammable gas to the porous vessel, it may be expedient as aspirate the gas to the porous vessel by means of an aspirator. Such appliances may be fixed at various positions in a coal mine for the purpose of giving an indication or record of the percentage of marsh gas present. They may also be used on board ships or in other situations for indicating the presence of oil vapor.

In the process of combustion on the platinum wire or its equivalent the water produced ensures the atmosphere in the porous vessel exposed to the inflammable vapors or gases being saturated. It may be desirable to ensure a similar condition being existent in the other porous vessel not exposed to the inflammable gases in regard to water vapor, and water may have to be added artifically either to one or both porous vessels. One method of doing this would be to utilize water vapor given off from a wick or its equivalent, part of which is immersed in water contained in a suitable receptacle and the whole placed in direct air tight communication with the interior of the porous vessel or vessels.

As applied to an instrument embodying two porous vessels, both vessels may be exposed to the inflammable vapor by utilizing in each of the vessels a platinum wire or its equivalent giving the equivalent amount of heat. For this purpose the wire in the second vessel may be enclosed in a bulb or its equivalent so as to seal it from the air and the bulb adapted to plug in or connect with appropriate terminals. Alternatively the wire in the second vessel may be exposed and be of such dimensions that its temperature is below the ignition point of the gases surrounding it. With either of these arrangements a more accurate, sensitive, or responsive reading or record of the inflammability of the atmosphere surrounding the instrument or apparatus can be obtained.

Figures 1 and 2 of the accompanying drawings illustrate in sectional side elevation and plan respectively an example of an apparatus for use in detecting the presence of inflammable gases according to the invention, only one of the porous vessel units being shown.

Figure 1:
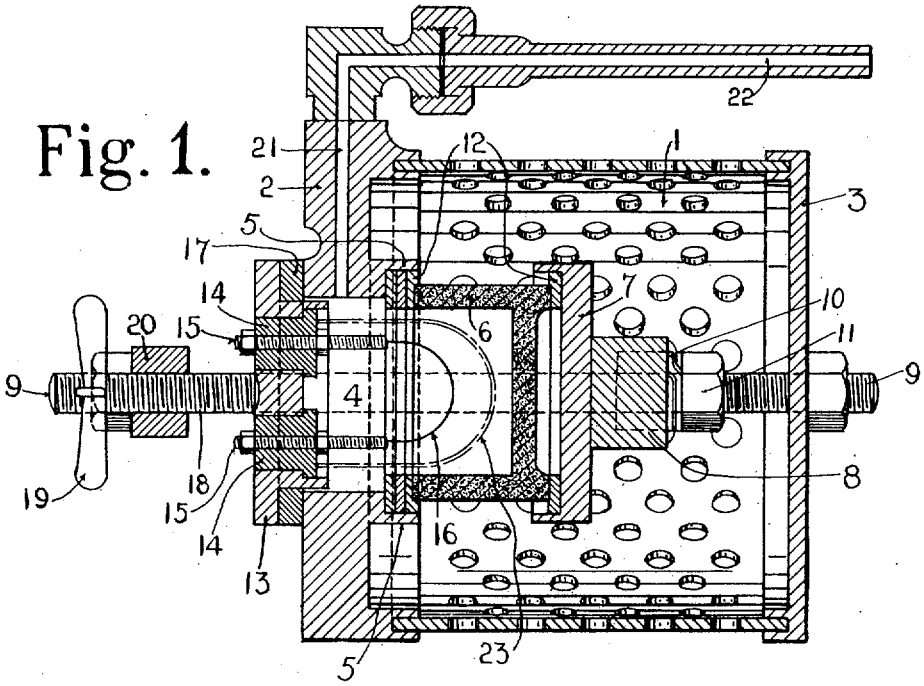
Figure 2:
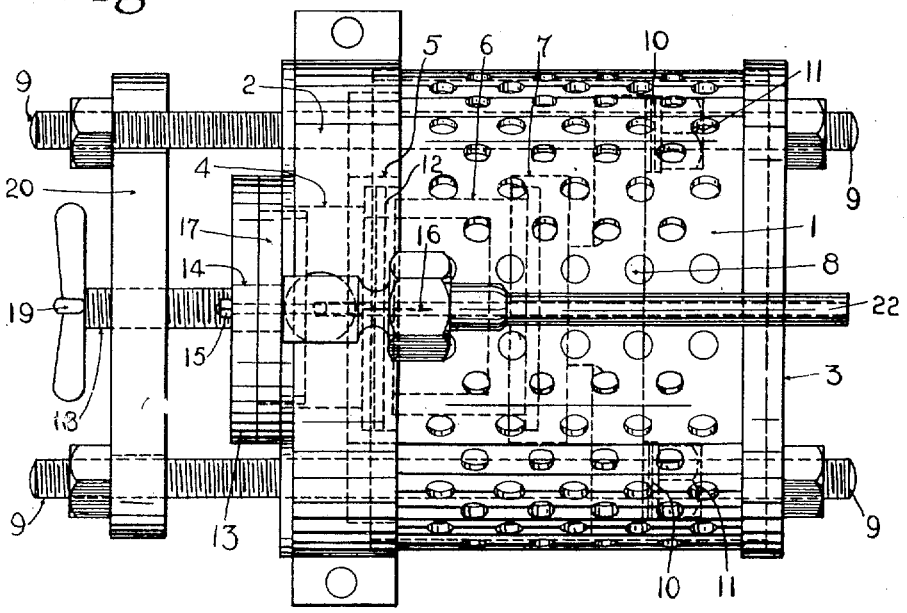

Referring to Figures 1 and 2 of the drawings, the apparatus comprises a perforated cylinder 1 carried between flanged end walls 2, 3, the end wall 2 being provided with a centrally disposed through opening or aperture 4 surrounded by an inwardly projecting flange 5 adapted to form a seating for one end of the porous vessel 6 which is secured in position within the perforated cylinder 1 by means of a flanged cap 7 and a clamping bar 8 mounted on screwed rods 9 passing through the cylinder 1, said clamping bar being held in position by means of spring washers 10 and nuts 11 mounted on said rods 9. Rubber or other packing rings 12 are located between the opposite ends of the porous vessel 6 and the cap 7 and seating flange 5 for ensuring tight joints between the parts. The through aperture or opening in the end wall 2 is closed by a removably mounted cover plate 13 provided with insulated bushes 14 carrying the terminals 15 of a platinum wire or filament 16 which projects into the porous vessel 6. A rubber or other packing ring 17 is placed between the wall 2 and the cover plate 13, and the latter is removably secured in position by means of a screw 18 having a winged head 19 and being passed through a cross-member or bar 20 carried between the adjacent ends of the screwed rods 9.

Figure 8:
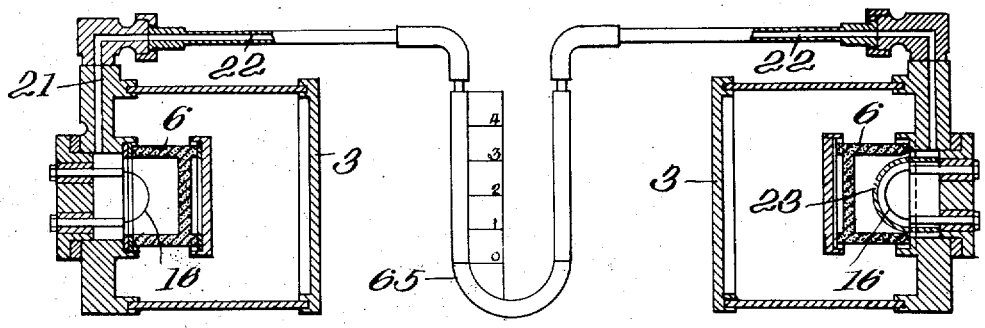
Fig. 8 illustrates an elevation, partially in section, of an embodiment of the invention in which two separate porous vessel units are disclosed, the units being connected by a manometer.

The end wall 2 is formed with a passage 21 communicating with the interior of the porous vessel 6 and leading by way of a pipe 22 to one limb of a manometer U-tube 65, Fig. 8, or other pressure indicator or recorder. A recorder gives an indication as well as making a record so that an indicator and a recorder are equivalents so far as this invention is concerned.

The other limb of the U-tube is connected to a porous vessel unit similar to the above, with the exception that the platinum wire or filament 16 is enclosed in a bulb or its equivalent 23, Fig. 8, and also as shown in dotted lines at Figure 1 of the drawings, so as to seal it from the surrounding air and gases which diffuse through the porous vessel 1.

Figure 9:
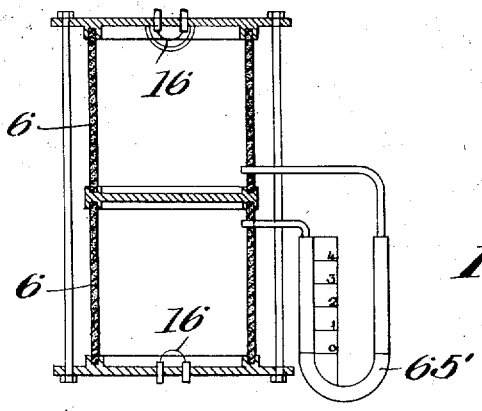
Fig. 9 illustrates an elevation, partially in section, of an embodiment similar to Fig. 8 in which the two units are formed in a single structure.

Instead of employing two separate porous vessel units as above described, two porous vessels may be built into a single portable unit by arranging them end to end with a partition or diaphragm between, as shown in Fig. 9, each outer end of the porous vessels being provided with a closing cover plate carrying the platinum wire or filament projecting into the adjacent porous vessel. The indicator or recorder 65′ may be mounted on the side of the double unit, and the cover plates may be connected together by threaded rods and nuts for holding the parts together.

Figure 3:
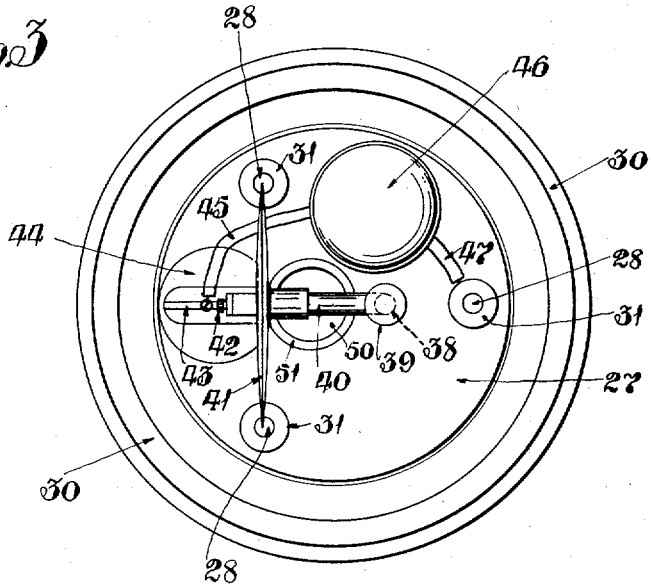
Figures 3 and 4 illustrate in plan and sectional side elevation respectively an embodiment of the invention in combination with an electric warning lamp adapted to be illuminated when the percentage of marsh gas reaches a predetermined quantity.
Figure 4:
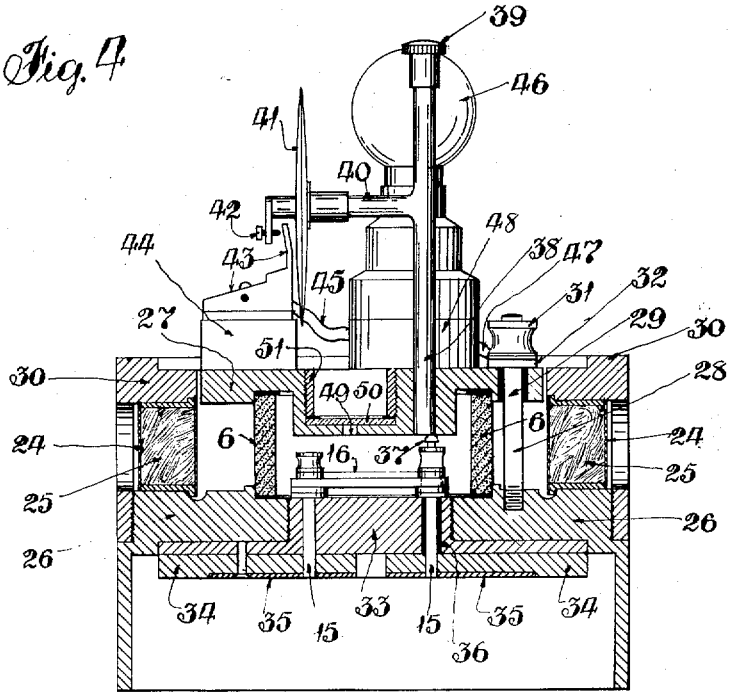

Referring to Figures 3 and 4 of the drawings, the apparatus comprises an annular gauze casing 24 containing glass wool 25 through which the gases pass to the porous vessel 6 clamped between a base member 26, forming the lid of a battery container (not shown) and an upper plate 27 by means of binding posts 28 which are screwed into the member 26 and pass through insulating bushes 29 in the plate 27. The gauze casing 24 is secured in position by an annular ring member 30 screwing on to the member 26, while the binding posts 28 are fitted at their upper ends with screw-on terminal heads 31 insulated from the plate 27 by ebonite or other insulating washers 32. Screwing into the member 26 is a metal disc member 33 carrying on its underside an ebonite or other insulating disc 34 fitted with contact segments 35 for engaging the battery terminals (not shown) while secured to the contact segments 35 and passing through the insulating disc 34 and the disc member 33 are terminals 15 which project into the porous vessel 6 and carry between them a platinum wire or other filament 16, one of said terminals 15 being insulated by an ebonite or other insulating sleeve 36 from the disc member 33. The insulated terminal 15 is provided at its upper end with a spring-pressed plunger 37 which contacts with the end of a vertical tube 38 sealed at its upper end by a cap 39 and having a right-angular branch 40 fitted with a collapsible diaphragm 41, said tube 38 being in communication with the interior of the porous vessel 6. The outer side of the diaphragm 41 carries a contact 42 in the form of an adjusting screw adapted, when the diaphragm collapses, to contact with a contact 43 mounted on an insulating block 44 on the plate 27. The contact 43 is connected by an insulated wire 45 to one filament contact of the lamp 46 and the other filament contact of the latter is connected by an insulated wire 47 to one of the binding posts 28. In use the inflammable gases which diffuse into the porous vessel 6 are burnt by coming into the vicinity of or contact with the heated platinum filament 16 and the water vapor so produced is condensed, thereby producing in said vessel 6 and its communicating tubes 38, 40 and diaphragm 41 a vacuum proportional to the amount of inflammable gases burnt, said diaphragm 41 collapsing owing to the difference in the pressures on the inside and the outside thereof. By appropriately positioning the adjustable contact 42 the collapsing of the diaphragm 41 may be caused to complete the circuit of the lamp 46 through the contacts 42, 43 when the percentage of inflammable gas or degree of vacuum reaches any predetermined quantity or point. The lamp 46 is mounted on an insulating block 48, and the plate 27 is formed with an opening 49 fitted with a transparent cover 50 which is held in place and sealed by a screw-threaded ferrule or sleeve 51, said opening 49 and transparent cover 50 permitting of the ready inspection of the filament 16.

Figure 5:
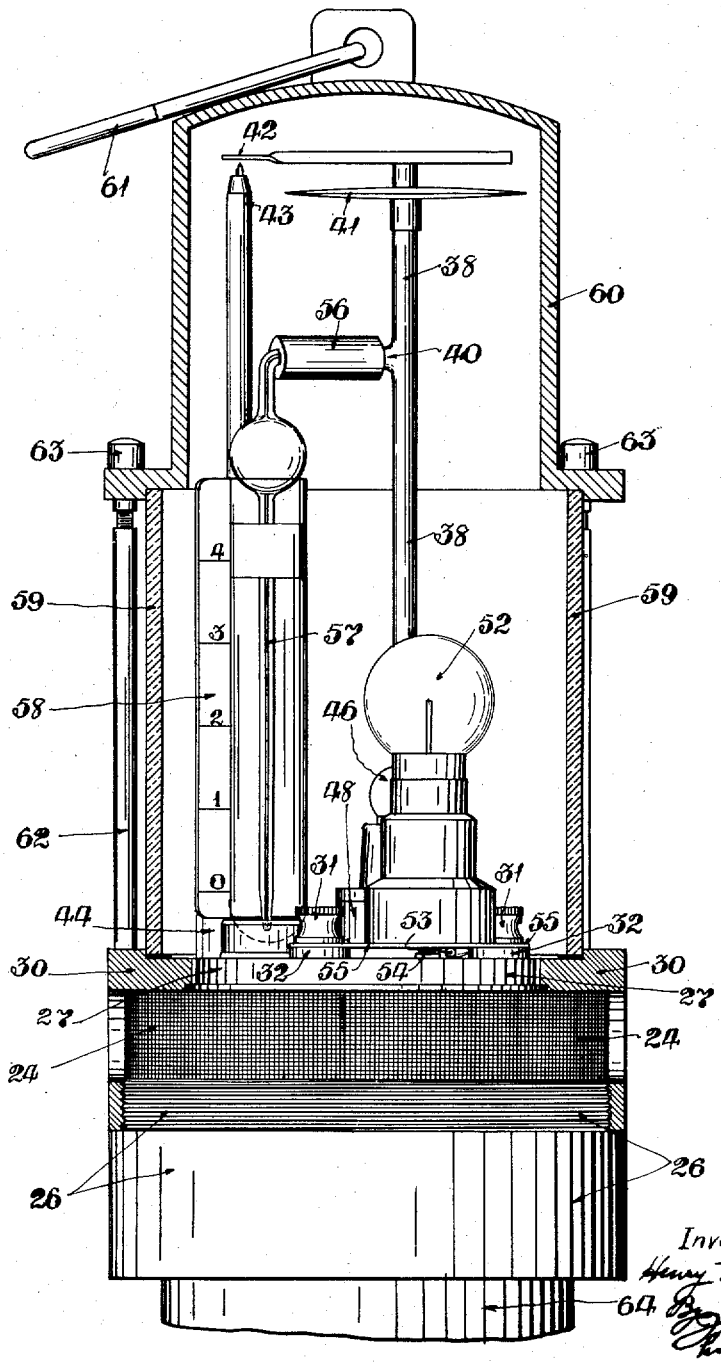
Figures 5, 6 and 7 illustrate in part sectional side elevation, plan and vertical section respectively an embodiment of the invention in combination with a miner's electric lamp, the arrangement being such as to give a visible indication on a manometer of the percentage of marsh gas and, when such percentage reaches a predetermined amount, to illuminate a warning lamp.
Figure 6:
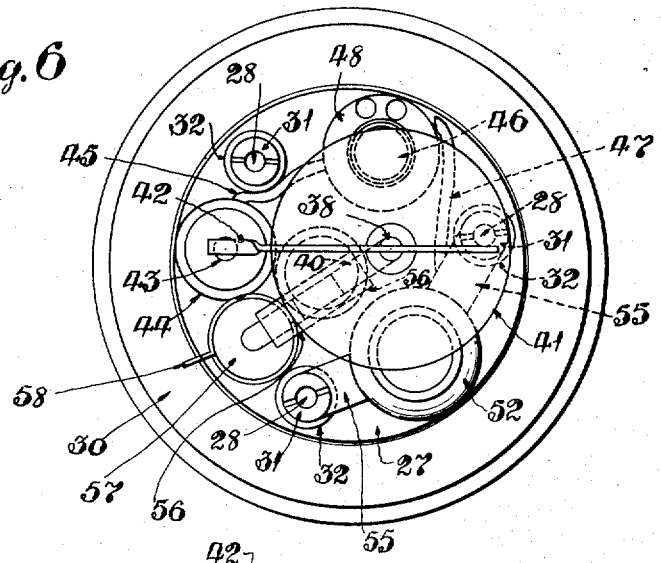
Figure 7:
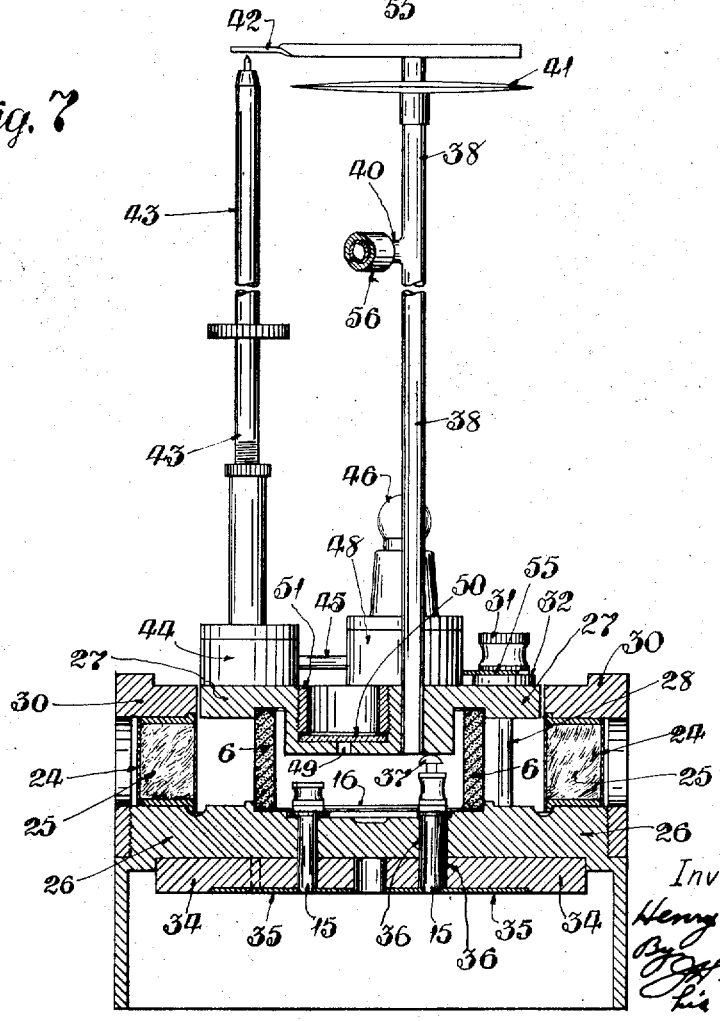

Referring to Figs. 5, 6 and 7 wherein like reference numerals to those in Figures 3 and 4 indicate like or analogous parts, the diaphragm 41 is carried at the upper end of the vertical tube 38 and the contact 43 is in the form of an extensible rod, while the contact 42 is fixed to the diaphragm 41. The wire 47 from the warning lamp 46 is connected to one of the filament contacts of an electric lamp 52, such filament contact being connected to the appropriate segment 35 by a wire 53 passing through an insulating tube 54, while the other filament contact of the lamp 52 is connected by arms 55 to two of the binding posts 28. The lamp 52 affords the light by which the miner works. The branch 40 is connected by a rubber sleeve 56 to a manometer 57 fitted with a graduated scale 58 for enabling a reading of the percentage of inflammable gases to be readily taken. The apparatus above the plate 27 is enclosed within a lamp glass 59 and top cover or cap 60, the latter being provided with a carrying handle 61 and connected to the ring member 30 by screwed pillars 62 and nuts 63. A battery container 64 fits into the base member 26.

Figure 10:
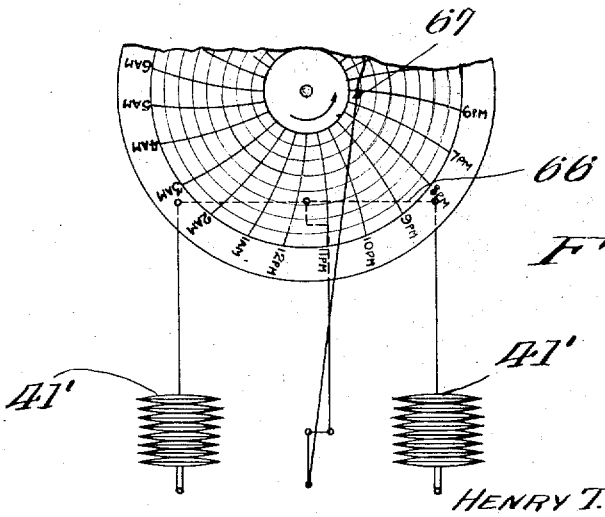
Fig. 10 is a plan view of a specific form of recording or indicating mechanism which is adapted for use with any of the porous vessel units, showing actuating diaphragms for the indicator.

Referring to Fig. 10 a recorder or indicating mechanism is illustrated in which a pair of multiple diaphragms 41′ are utilized, these diaphragms being designed for connection to the porous units of the gas detector in a manner similar to the manometer 65. These diaphragms are pivotally connected to a balance lever 66 which is connected through links and levers to a pen 67.

It will be obvious that the created vacuum in one of the porous units will cause the multiple diaphragm connected thereto, for example, the left hand diaphragm of Fig. 10, to collapse so as to pull down the associated connecting rod and partially rotate the balance lever 66 and the top rock shaft in an anti-clockwise direction. This rotation of the top rod shaft swings the depending crank to the left and through the medium of the link and crank on the pen rock shaft to partially rotate the latter in a clockwise direction and move the pen 67. The movement of the pen is proportioned to and varies with the degree of vacuum. The chart is rotated in an anti-clockwise direction by a clock movement so that a continuous record or graph is produced on the chart. This operation is very similar to that disclosed in Figs. 3 to 7, in which the diaphragm 41 is collapsed to operate an electric recording or indicating mechanism.

It will be observed that in the apparatus shown the platinum filaments are always heated, the atmosphere with any combustible gases or vapors mixed with it is constantly diffusing through the walls of the porous vessels, and said constituents are burned as fast as they come into contact with the filament. The apparatus, therefore, is continuously responsive to changes in the composition of the atmosphere so far as that composition has to do with the presence of combustible constituents. Moreover, the use of absorbents with their objections and the necessity for renewing them is avoided.

Having thus described my invention, what I desire to claim as new is:

1. In an apparatus for detecting the presence of combustible gas, the combination of a porous vessel, a catalytic element in said vessel operative to promote combustion of inflammable gases entering said vessel, an electrical circuit in which said element is included serving to maintain said element in an active condition, a second vessel exposed to said gas and having a catalytic element therein included in said circuit but inoperative to cause combustion of the gas in said second vessel, and means connected with said vessels for indicating the differences in gaseous pressure in them.

2. In an apparatus for detecting the presence of combustible gas, the combination of a substantially closed vessel affording a substantially continuous admission of gas thereto and being capable of maintaining for an appreciable period of time sudden changes in gaseous pressure created therein, means in said vessel for causing said combustible gas entering the same to be gradualy burned therein, said vessel being constructed and arranged to condense the water vapor produced by such combustion, means connected with said vessel and arranged for actuation by changes in the gaseous pressure created in the vessel by said combustion of gas and condensation of water vapor therein, and an indicating means connected to said last named means for actuation thereby.

3. In an apparatus for detecting the presence of combustible gas, the combination of a substantially closed vessel affording a substantially continuous admission of gas thereto and being capable of maintaining for an appreciable period of time sudden changes in gaseous pressure created therein, means in said vessel for causing said combustible gas entering the same to be gradually burned therein, said vessel being constructed and arranged to condense the water vapor produced by such combustion, means connected with said vessel and arranged for actuation by changes in the gaseous pressure created in the vessel by said combustion of gas and condensation of water vapor therein, and additional means arranged to be operated by said last named means for indicating the presence and relative quantity of combustible gases.

4. In an apparatus for detecting the presence of combustible gas, the combination of a porous vessel, means in said vessel for causing combustible gas entering the vessel to be burned gradually therein, a collapsible diaphragm mounted on said vessel and having its interior in communication with the interior of said vessel whereby changes of pressure in said vessel due to burning of the gases will be transmitted to the interior of said diaphragm, and means for indicating variations in pressure created in said vessel, said means being arranged to be actuated by movements of said diaphragm.

5. In an apparatus for testing the atmosphere for the presence of combustible gases mixed therewith, the combination of a substantially closed vessel affording a restricted and continuous admission of the atmosphere thereto and its escape therefrom, said vessel being capable of maintaining for an appreciable period of time sudden changes in gaseous pressure created therein, means in said vessel for burning combustible constituents of said atmosphere as said constituents diffuse through the chamber in the vessel, said vessel being constructed and arranged to condense the water vapor produced by such combustion but to prevent any substantial absorption of the gases, and means connected with said vessel for responding automatically to changes in the gaseous pressure created in said vessel by said condensation.

6. In an apparatus for testing the atmosphere for the presence of combustible gases mixed therewith, the combination of a substantially closed vessel affording a restricted and continuous admission of the atmosphere thereto and its escape therefrom, said vessel being capable of maintaining for an appreciable period of time sudden changes in gaseous pressure created therein, means in said vessel for burning combustible constituents of said atmosphere as said constituents diffuse through the chamber in the vessel, said vessel being constructed and arranged to condense the water vapor produced by such combustion but to prevent any substantial absorption of the gases, and means connected with said vessel for indicating automatically changes in the gaseous pressure created in said vessel by said condensation.

7. In an apparatus for testing the atmosphere for the presence of combustible gases mixed therewith, the combination of a substantially closed vessel affording a restricted and continuous admission of the atmosphere thereto and its escape therefrom, said vessel being capable of maintaining for an appreciable period of time sudden changes in gaseous pressure created therein, means in said vessel for burning combustible constituents of said atmosphere as said constituents diffuse through the chamber in the vessel, said vessel being constructed and arranged to condense the water vapor produced by such combustion but to prevent any substantial absorption of the gases, means connected with said vessel for responding automatically to changes in the gaseous pressure created in said vessel by said condensation, and an electric circuit under the control of the last named means.

8. In an apparatus for testing the atmosphere for the presence of combustible gases mixed therewith, the combination of a substantially closed vessel affording a restricted and continuous admission of the atmosphere thereto and its escape therefrom, said vessel being capable of maintaining for an appreciable period of time sudden changes in gaseous pressure created therein, means in said vessel for burning combustible constituents of said atmosphere as said constituents diffuse through the chamber in the vessel, said vessel being constructed and arranged to condense the water vapor produced by such combustion but to prevent any substantial absorption of the gases, a second vessel in which temperature and pressure conditions are maintained similar to those existing under ordinary circumstances in said first vessel, and means connected with both of said vessels for responding automatically to the difference in gaseous pressure in the two vessels.

9. In an apparatus for testing the atmosphere for the presence of combustible gases mixed therewith, the combination of a substantially closed vessel affording a restricted and continuous admission of the atmosphere thereto and its escape therefrom, said vessel being capable of maintaining for an appreciable period of time sudden changes in gaseous pressure created therein, means in said vessel for burning combustile constituents of said atmosphere as said constituents diffuse through the chamber in the vessel, said vessel being constructed and arranged to condense the water vapor produced by such combustion but to prevent any substantial absorption of the gases, a second vessel in which temperature and pressure conditions are maintained similar to those existing under ordinary circumstances in said first vessel, an indicating means connected with both of said vessels for responding automatically to the difference in gaseous pressure in the two vessels.

10. In an apparatus for testing the atmosphere for the presence of combustible gases mixed therewith, the combination of a substantially closed vessel having a porous wall through which a restricted and substantially continuous diffusion of the atmosphere can take place, the vessel being capable of maintaining for an appreciable period of time sudden changes in gaseous pressure created therein, electrically heated means in said vessel for burning combustible constituents of said atmosphere approximately as fast as they come into contact with said means, said vessel being constructed and arranged to condense the water vapor produced therein by the burning of said combustible constituents but being arranged to prevent any substantial absorption of the gases therein, and a pressure responsive apparatus connected with said vessel and arranged to be operated automatically by the changes in gaseous pressure created in said vessel by said condensation.

11. In an apparatus for testing the atmosphere for the presence of combustible gases mixed therewith, the combination of a substantially closed vessel having a porous wall through which a restricted and substantially continuous diffusion of the atmosphere can take place, the vessel being capable of maintaining for an appreciable period of time sudden changes in gaseous pressure created therein, electrically heated means in said vessel for burning combustible constituents of said atmosphere approximately as fast as they come into contact with said means, said vessel being constructed and arranged to condense the water vapor produced therein by the burning of said combustible constituents but being so arranged as to prevent any substantial absorption of the gases therein, a second porous walled vessel exposed to said atmosphere, electrically heated means in it for maintaining approximately the same temperature in the second vessel as that maintained under ordinary circumstances in the first vessel but prevented from igniting combustible constituents of the atmosphere which may enter the second vessel, and pressure responsive means connected with both of said vessels and arranged to be operated by the difference in pressure in said vessels.

12. In an apparatus for testing the atmosphere for the presence of combustible gases mixed therewith, the combination of a substantially closed vessel having a porous wall through which a restricted and substantially continuous diffusion of the atmosphere can take place, the vessel being capable of maintaining for an appreciable period of time sudden changes in gaseous pressure created therein, electrically heated means in said vessel for burning combustible constituents of said atmosphere approximately as fast as they come into contact with said means, said vessel being constructed and arranged to condense the water vapor produced therein by the burning of said combustible constituents but being arranged to prevent any substantial absorption of the gases therein, a second porous walled vessel exposed to said atmosphere, electrically heated means in it for maintaining approximately the same temperature in the second vessel as that maintained under ordinary circumstances in the first vessel but prevented from igniting combustible constituents of the atmosphere which may enter the second vessel, and pressure responsive means connected with both of said vessels and arranged to be operated by the difference in pressure in said vessels, an electric circuit in which both of said heating means are connected, and an indicating means associated with said pressure responsive means.

13. That improvement in methods of detecting the presence of marsh gas or other combustible gases in the atmosphere, which consists in exposing to the atmosphere a substantially closed vessel, passing said atmosphere into said vessel under restricted conditions and diffusing same through the vessel, as a substantially continuous operation, burning combustible gaseous constituents thereof in said vessel as they diffuse through the interior of said vessel, condensing the water vapor produced in said vessel by such combustion, while preventing any substantial absorption of the gases in said vessel, and utilizing the changes in gaseous pressure created in said vessel by said condensation to operate a pressure responsive apparatus.

14. That improvement in methods of detecting the presence of marsh gas or other combustible gases in the atmosphere, which consists in exposing to the atmosphere a substantially closed vessel, passing said atmosphere into said vessel under restricted conditions and diffusing same through the vessel, as a substantially continuous operation, burning combustible gaseous constituents thereof in said vessel as they diffuse through the interior of said vessel, condensing the water vapor produced in said vessel by such combustion, while preventing any substantial absorption of the gases in said vessel, creating a gaseous pressure in another similar vessel in which temperature and pressure conditions are maintained approximating those in the first vessel when the latter are not affected by the presence of combustible gas in the atmosphere, placing the pressure in the second vessel in opposition to the gaseous pressure in the first vessel, and utilizing the difference in the pressures in the two vessels to operate a pressure responsive apparatus.

15. That improvement in methods of detecting the presence of marsh gas or other combustible gases in the atmosphere, which consists in exposing to the atmosphere a substantially closed vessel, passing said atmosphere into said vessel under restricted conditions and diffusing same through the vessel, as a substantially continuous operation, burning combustible gaseous constituents thereof in said vessel as they diffuse through the interior of said vessel, condensing the water vapor produced in said vessel by such combustion, while preventing any substantial absorption of the gases in said vessel, creating a gaseous pressure in another similar vessel in which temperature and pressure conditions are maintained approximating those in the first vessel when the latter are not affected by the presence of combustible gas in the atmosphere, placing the pressure in the second vessel in opposition to the gaseous pressure in the first vessel, utilizing the difference in the pressures in the two vessels to operate a pressure responsive apparatus, measuring the differences in gaseous pressure in said vessels, and recording the obtained measurements.

16. That improvement in methods of detecting the presence of marsh gas or other combustible gases in the atmosphere, which consists in exposing to the atmosphere a substantially closed vessel, passing said atmosphere into said vessel under restricted conditions and diffusing same through the vessel as a substantially continuous operation, burning combustible gaseous constituents thereof in said vessel as they diffuse through the interior of said vessel, condensing the water vapor produced in said vessel by such combustion, while preventing any substantial absorption of the gases in said vessel, creating a gaseous pressure in another similar vessel in which temperature and pressure conditions are maintained approximating those in the first vessel when the latter are not affected by the presence of combustible gas in the atmosphere, and measuring the differences in gaseous pressure in said vessels.

17. That improvement in methods of detecting the presence of marsh gas or other combustible gases in the atmosphere, which consists in continuously passing said atmosphere through the walls of a substantially closed vessel by diffusion or aspiration, burning combustible gaseous constituents thereof in said vessel as they diffuse through the interior of said vessel, condensing the water vapor produced in said vessel by such combustion while preventing any substantial absorption of the gases, to create a vacuum, actuating a pressure responsive apparatus by the changes in gaseous pressure created in said chamber by such condensation and vacuum, and measuring the changes in pressure.

H. T. RINGROSE.